United States Patent [19]

Sugino

[11] Patent Number: 5,425,082
[45] Date of Patent: Jun. 13, 1995

[54] COMMUNICATION PROCESSING APPARATUS, COMMUNICATION PROCESSING SYSTEM, AND COMMUNICATION PROCESSING METHOD

[75] Inventor: Kazumasa Sugino, Inagi, Japan

[73] Assignee: Canon Kabushiki Kaisha, Tokyo, Japan

[21] Appl. No.: 936,625

[22] Filed: Aug. 28, 1992

[30] Foreign Application Priority Data

Sep. 4, 1991 [JP] Japan ................................ 3-223910
Jul. 20, 1992 [JP] Japan ................................ 4-192322

[51] Int. Cl.⁶ .................... H04M 11/00; H04M 1/64
[52] U.S. Cl. .................................. 379/100; 379/93; 379/96; 379/88
[58] Field of Search ............... 379/93, 96, 97, 98, 379/100, 53, 88; 358/85, 402, 450; 381/52, 44

[56] References Cited

U.S. PATENT DOCUMENTS

| | | | |
|---|---|---|---|
| 4,837,798 | 6/1989 | Cohen et al. | 379/88 |
| 4,907,094 | 3/1990 | Mishima et al. | 358/404 |
| 4,961,185 | 10/1990 | Sawada | 370/79 |
| 4,996,707 | 2/1991 | O'Malley et al. | 379/100 |
| 5,084,770 | 1/1992 | Nakagama | 358/402 |
| 5,091,931 | 2/1992 | Milewski | 381/52 |
| 5,164,980 | 11/1992 | Bush et al. | 379/53 |

FOREIGN PATENT DOCUMENTS 0372894  6/1990  European Pat. Off. ........ H04N 1/21
0014133  1/1984  Japan .................................... 381/52

OTHER PUBLICATIONS

Welch, T. A., "A Technique for High-Performance Data Compression", Computer, vol. 17, No. 6, Jun. 1984, pp. 8–19.
Patent Abstracts of Japan, E field, vol. 14, No. 95, Feb. 21, 1990 The Patent Office Japanese Government, p. 99 E 892 & JP-A-01 300 689.

Primary Examiner—Curtis Kuntz
Assistant Examiner—Jason Chan
Attorney, Agent, or Firm—Fitzpatrick, Cella, Harper & Scinto

[57] ABSTRACT

In a communication processing apparatus, communication processing system and communication processing method for performing communication processing between a transmitting unit and a receiving unit via a line, the transmitting unit converts audio into digital data, converts the resulting digital data into code data, units the resulting code data and document data prepared in advance and transmits the united data. The receiving unit receives the data from the transmitting unit, converts, into digital data, code data which corresponds to audio contained in the received data, converts the resulting digital data into analog data, and produces an audio output based upon the resulting analog data.

18 Claims, 15 Drawing Sheets

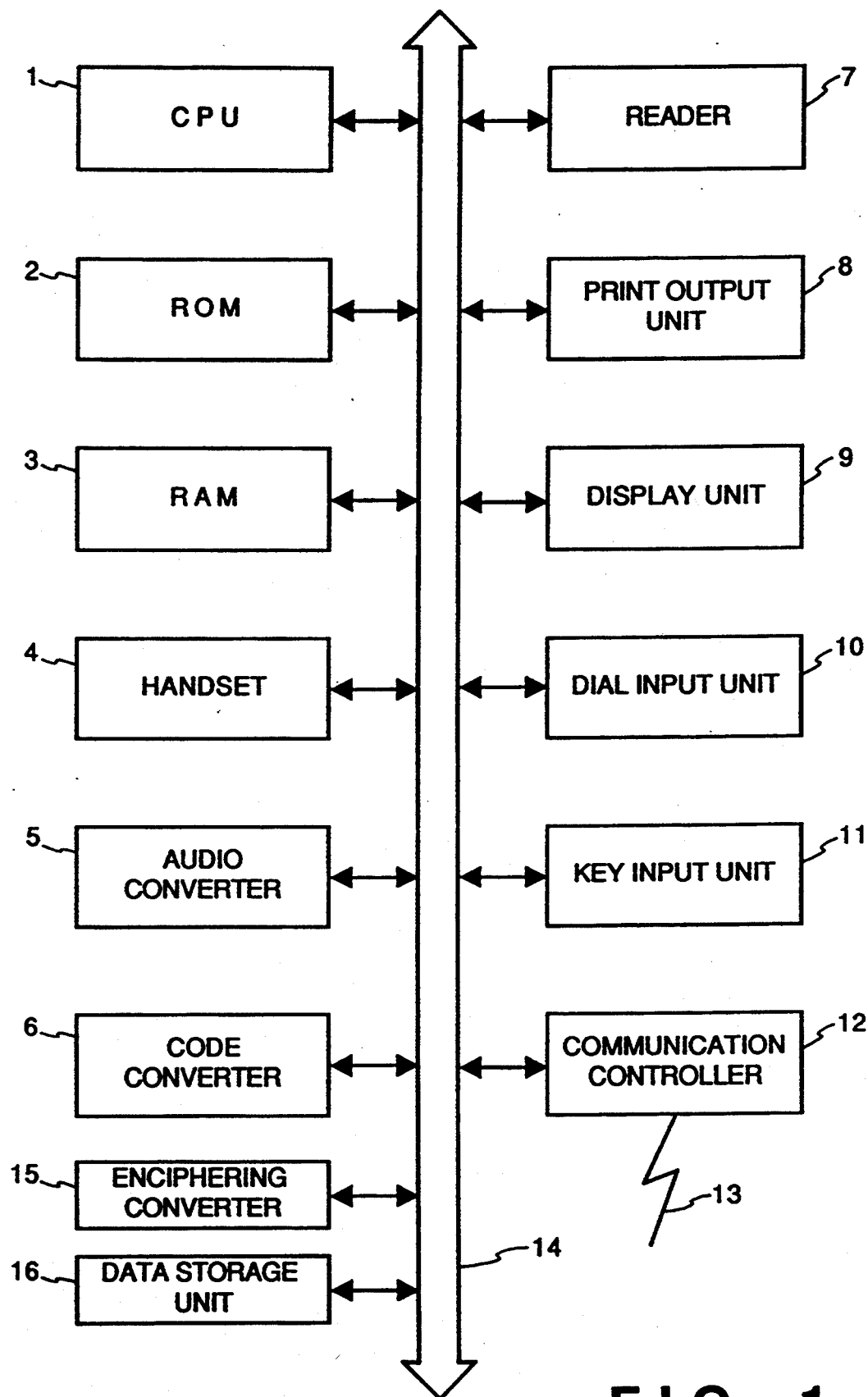
F I G. 1

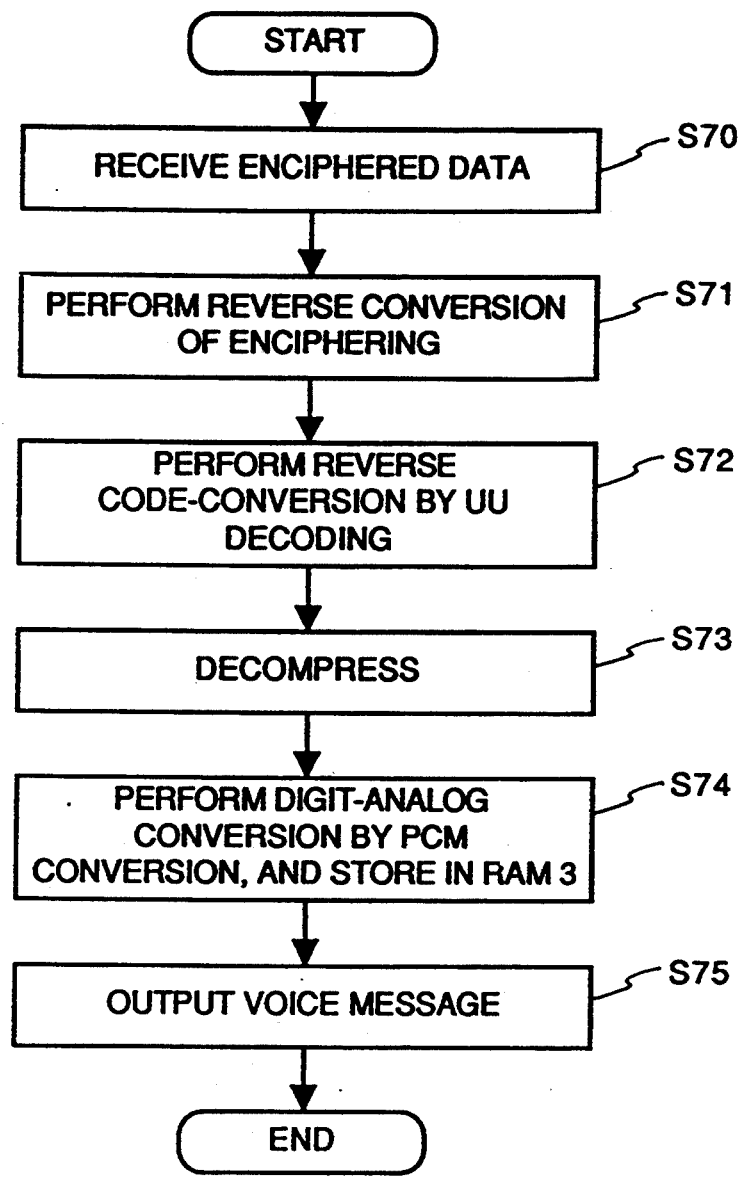
F I G. 7

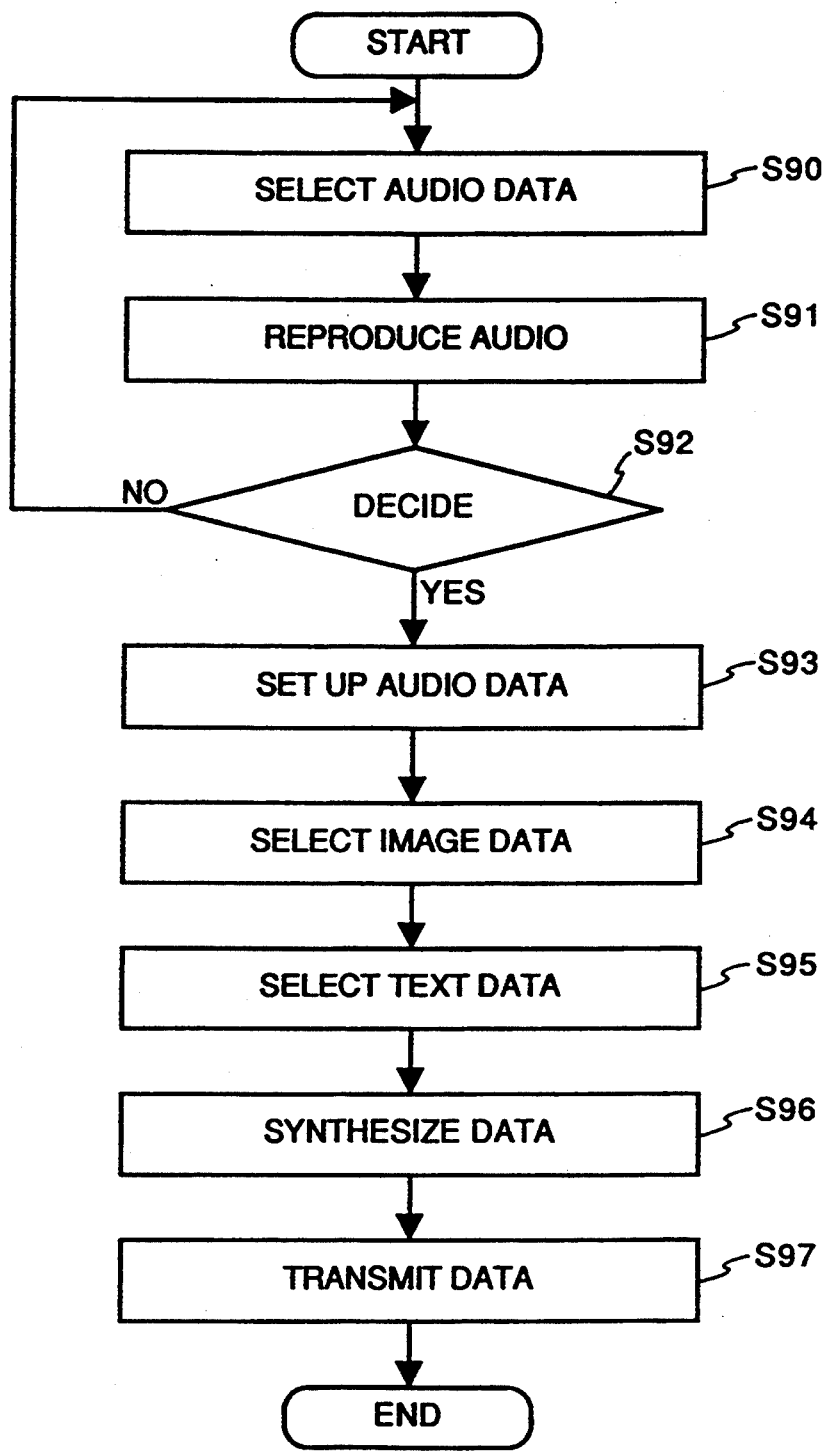
F I G. 9

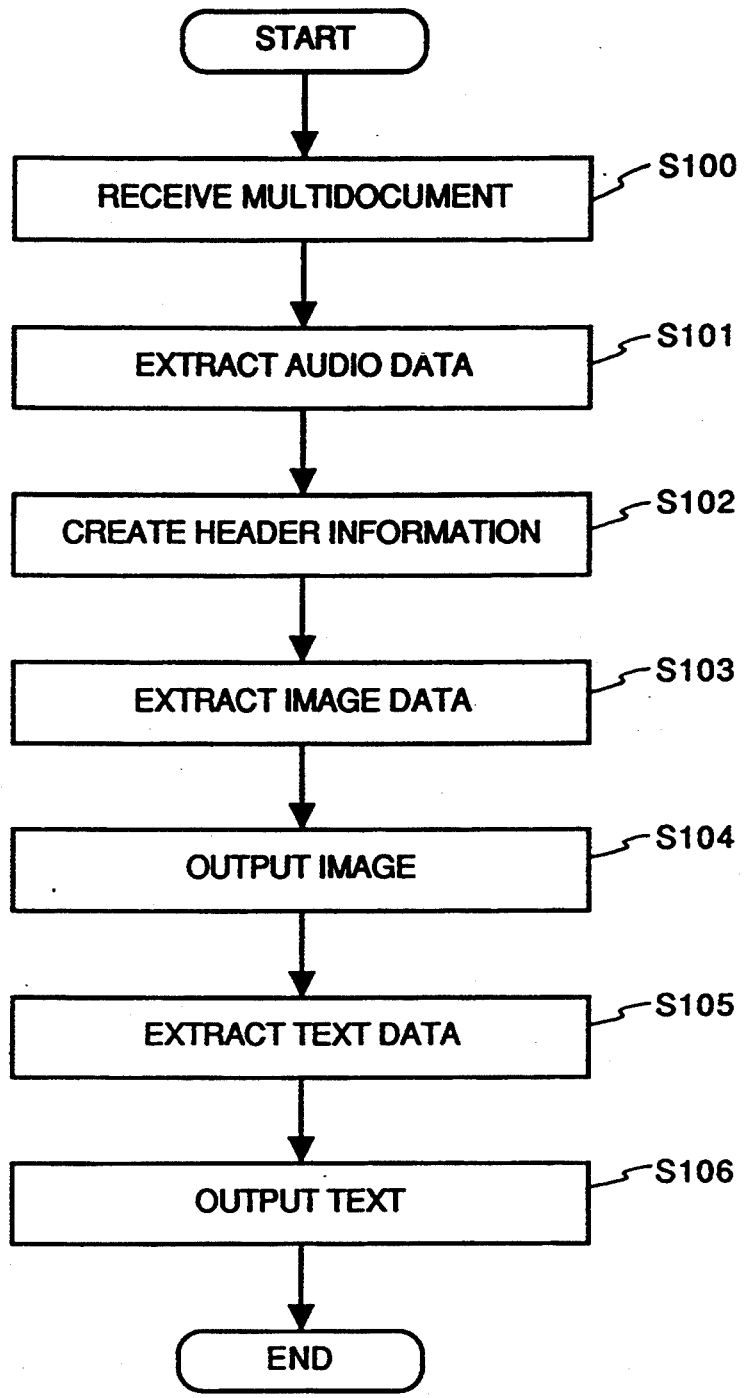
F I G. 10

| TIME RECEIVED |
| --- |
| OTHER PARTY'S DIAL NO. |
| OTHER PARTY'S ABBREVIATED NAME |
| RECEIVING PARTY'S ABBREVIATED NAME |
| RELATED-DOCUMENT POINTER |

FIG. 14

```
1. 90' 12. 25  11:05   O×△ SALES 03-758-2111   SOUND, PICTURE, DOCUMENT 2. 90' 12. 25  10:30   03-111-1111             SOUND, PICTURE 3. 90' 12. 24  17:30   O×△ U.S.A.              PICTURE, SOUND

COMMUNICATION PROCESSING APPARATUS, COMMUNICATION PROCESSING SYSTEM, AND COMMUNICATION PROCESSING METHOD

BACKGROUND OF THE INVENTION

This invention relates to a communication processing apparatus, a communication processing system and a communication processing method, in which the communication processing apparatus has a telephone, which serves as an audio input/output unit, a facsimile device equipped with an image/text input/output unit, a communication unit, an enciphering unit, a display unit and a touch-panel dial input unit, as well as an external storage device such as a hard disk, a photomagnetic disk or a digital audio tape.

In our information-oriented society which has seen remarkable progress in recent years, the existence of the facsimile machine is of growing importance in that it has the ability to transmit information accurately, rapidly and in mixed form. In terms of the transmission of information in mixed form, a so-called multimedia function, through which audio and images are capable of being sent and received by a single apparatus, is important in the sense that complex, diversified information may be processed in a skillful manner.

In a case where it is desired to record received audio or image data in advance or to edit audio data that has already been recorded even when a function for this purpose is not available, it is necessary to create audio data using a device such as a tape recorder.

More specifically, with a device such as the conventional facsimile machine, it is possible to send and receive audio using the attached telephone, and to send and receive images using a facsimile device. Thus, these two different media can be handled by a single device.

In recent years, however, the diversification of communication media has been accompanied by increasing demand for achieving an interrelationship between audio data and image data such as facsimile image data.

The enciphering of image data has long been known. Specifically, a value serving as a code is decided by negotiation prior to transmission of image data between the sending and receiving sides. This value is preset on the sending and receiving sides. On the sending side, the value serving as the code is scrambled with the image data before the transmission is made. On the receiving side, the received data that has been enciphered based upon the value serving as the code is converted to reproduce the original image.

When audio and image data are communicated in interrelated form in the prior art described above, an absolute requirement is that the receiving party be present at the facsimile machine at the time that the image data are transmitted. This places a severe restriction upon the side receiving the data.

If the received audio and image data are stored in a memory device in inter-related form, a tape recorder is required in addition to the facsimile machine, and the separately recorded or stored data must be properly arranged and managed on the receiving side. This is a very troublesome task.

In a case where transmitted audio data are recorded in advance or already recorded audio data are edited, a tape recorder is required besides the facsimile machine. This is highly inconvenient.

Thus, in the prior art, the user is not furnished with a useful function through which audio, namely a voice message for supplementing an image, and the image are processed in interrelated form.

SUMMARY OF THE INVENTION

An object of the present invention is to provide a communication processing apparatus, a communication processing system and a communication processing method through which the foregoing drawbacks of the prior art can be eliminated.

Another object of the present invention is to provide a communication processing apparatus, a communication processing system and a communication processing method in which it is unnecessary to limit the actions of the receiving party and a tape recorder is no longer required, and in which audio and images can be interrelated with ease and stored and the audio can be edited.

Another object of the present invention is to provide a communication processing apparatus, a communication processing system and a communication processing method in which a voice message can be appended in order to supplement the contents of transmitted image data.

Still another object of the present invention is to provide a communication processing apparatus in which the contents of image data that have been transmitted can be discriminated before the data are outputted, thereby making it possible to utilize paper resources effectively, as by excluding output of unwanted images sent by wrongful use of facsimile transmission.

A further object of the present invention is to provide a communication processing apparatus, a communication processing system and a communication processing method in which, when a questionnaire or the like is transmitted, responses having greater accuracy can be gathered by offering guidance through voice messages.

A further object of the present invention is to provide a communication processing apparatus, a communication processing system and a communication processing method in which, by converting audio into code data, the code data are stored in an external device and a voice message is capable of being edited by using the stored data.

Yet another object of the present invention is to provide a communication processing apparatus, a communication processing system and a communication processing method in which effective utilization can be made of voice messages that the user has recorded in the past, and in which a voice message sent from another party is stored and this voice message is appended to a voice message or image data to be transmitted for the purpose of replying, whereby the replying party can be notified more clearly as to the nature of the matter requiring a reply.

Yet another object of the present invention is to provide a communication processing apparatus, a communication processing system and a communication processing method through which it is possible to manage a history of responses and agreements by accumulating and consolidating audio and images sent in combined form.

A further object of the present invention is to provide a communication processing apparatus, a communication processing system and a communication processing method in which the enciphering not only of images as in the prior art but also of audio from a telephone makes it possible to improve the reliability of communication in terms of maintaining the confidentiality of communication data.

Another object of the present invention is to provide a communication processing apparatus comprising first converting means for converting audio into digital data, second converting means for converting the digital data, which has been converted by the first converting means, into code data, and transmitting means for uniting and transmitting the code data converted by the second converting means and document data prepared in advance.

Another object of the present invention is to provide a communication processing apparatus comprising first converting means for converting audio into digital data, second converting means for converting the digital data, which has been converted by the first converting means, into code data, third converting means for converting the code obtained by the second converting means into enciphered data, and transmitting means for uniting and transmitting the enciphered data converted by the third converting means and document data prepared in advance.

Another object of the present invention is to provide a communication processing system for performing communication processing between a transmitting apparatus and a receiving apparatus via a line, wherein the transmitting apparatus has first converting means for converting audio into digital data, second converting means for converting the digital data, which has been converted by the first converting means, into code data, and transmitting means for uniting and transmitting the code data converted by the second converting means and document data prepared in advance, and the receiving apparatus has receiving means for receiving data from the transmitting apparatus, third converting means for converting, into digital data, code data corresponding to audio in the data received by the receiving means, fourth converting means for converting the digital data, which has been converted by the third converting means, into analog data, and output means for producing an audio output based upon the analog data converted by the fourth converting means.

Another object of the present invention is to provide a communication processing method comprising a first step of converting audio into digital data, a second step of converting the digital data, which has been converted by the first converting step, into code data, a transmitting step of uniting and transmitting the code data converted by the second converting step and document data prepared in advance, a receiving step of receiving data transmitted by the transmitting step, a third converting step of converting, into digital data, code data corresponding to audio in the data received by the receiving step, a fourth converting step of converting the digital data, which has been converted by the third converting step, into analog data, and a step of producing an audio output based upon the analog data converted by the fourth converting step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram showing the construction of a facsimile apparatus according to a first embodiment of the present invention;

FIG. 7 is a flowchart for describing a fourth communication control procedure by a CPU according to this embodiment;

FIG. 9 is a flowchart for describing a sixth communication control procedure by a CPU according to this embodiment;

FIG. 10 is a flowchart for describing a seventh communication control procedure by a CPU according to this embodiment;

FIGS. 13A, 13B, 14 and 15 are diagrams for giving a supplementary explanation of the eighth communication control procedure according to this embodiment.

DESCRIPTION OF THE PREFERRED EMBODIMENT

Figure 2A:
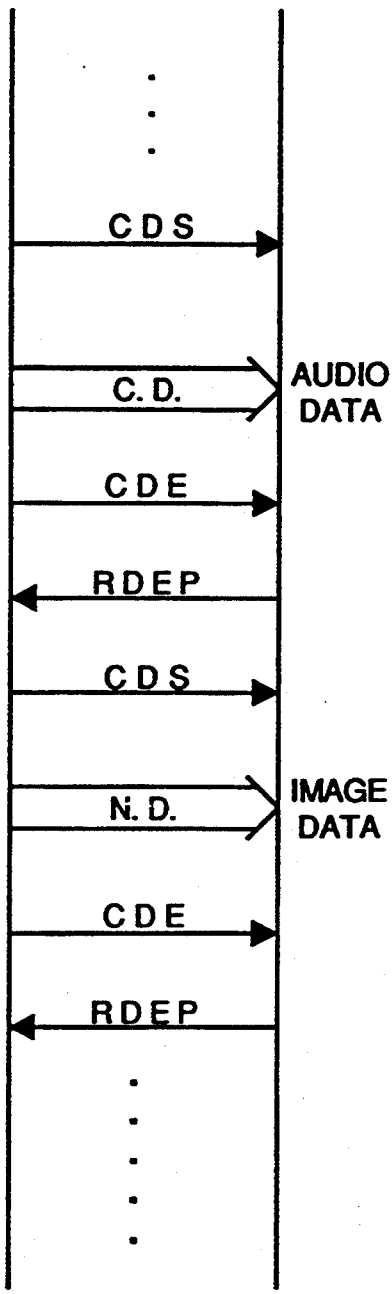
FIGS. 2A and 2B are diagrams illustrating examples of communication procedures according to recommendation T62 in accordance with this embodiment.

A preferred embodiment of the present invention will now be described in detail with reference to the accompanying drawings.

FIG. 1 is a block diagram illustrating the construction of a facsimile apparatus embodying the present invention. As shown in FIG. 1, the facsimile apparatus includes a CPU 1 comprising a microprocessor or the like. The elements described below are connected to a system bus 14 comprising address and data buses of the CPU 1, and the CPU 1 controls these elements to carry out a facsimile communication operation.

Specifically, a ROM 2 and a RAM 3, which serves as a working area, are connected to the system bus 14. The control program of the CPU 1 is stored in the ROM 2, and the RAM 3 is employed as the working area of the CPU 1.

The apparatus further includes a handset 4 for converting a voice into an audio signal (analog data) and sending the analog data to the system bus 14. The analog data are inputted, converted into a voice and outputted via the system bus 14. The audio signal is inputted to an audio converter 5 via the system bus 14, and the audio converter 5 converts the audio signal into digital data by a PCM (pulse-code modulation) conversion and sends the digital data to the system bus 14. The digital data are inputted via the system bus 14 and subjected to a reverse PCM conversion so as to be converted into an audio signal (analog data), and the analog data are sent to the system bus 14.

The digital data are inputted to a code converter 6 via the system bus 14. The code converter 6 converts the digital data into a code and sends the code data to the system bus 14. The code data are inputted via the system bus 14 and converted into digital data, and the digital data are sent to the system bus 14.

A reader 7 reads image data, performs code compression into an MH (modified Huffman) code, an MR (modified read) code or MMR (modified-modified read) code and sends the compressed data to the system bus 14. The compressed image data or text data are inputted to a print output unit 8 via the system bus 14, and the unit 8 outputs the data on paper.

A display unit 9 comprises a liquid-crystal device (LCD) for displaying various messages illustrated in FIG. 15. Further, the display unit 9 serves as a touch panel which displays "NO" and "YES" buttons. By pressing the "NO" button, a "NO" operation can be selected; pressing the "YES" button selects a "YES" operation.

A dial input unit 10, which is used when inputting another party's number, is capable of inputting numerals ("1", "2", "3", . . . ). A key input unit 11, which is used when creating text data, is capable of inputting English characters as well as hiragana and katakana characters of the Japanese syllabary. A communication controller 12 comprises a modem, an NCU (network control unit) and a call-signal detector, etc. The communication controller 12 interfaces the facsimile apparatus with a line 13, such as a telephone or ISDN (integrated service digital network). An enciphering converter 15, by coding audio data, is capable of being applied to audio data as well. Numeral 16 denotes a data storage unit which uses a hard disk or a photomagnetic disk.

By way of example, in a G4 facsimile machine which employs recommendation T62 of the CCITT (International Telegraph and Telephone Consultative Committee), a system employing a control document is employed as the system for transmitting character data. It is possible to distinguish the control document by a document-identifier parameter of a CDs command defined in recommendation T62.

Figure 2B:
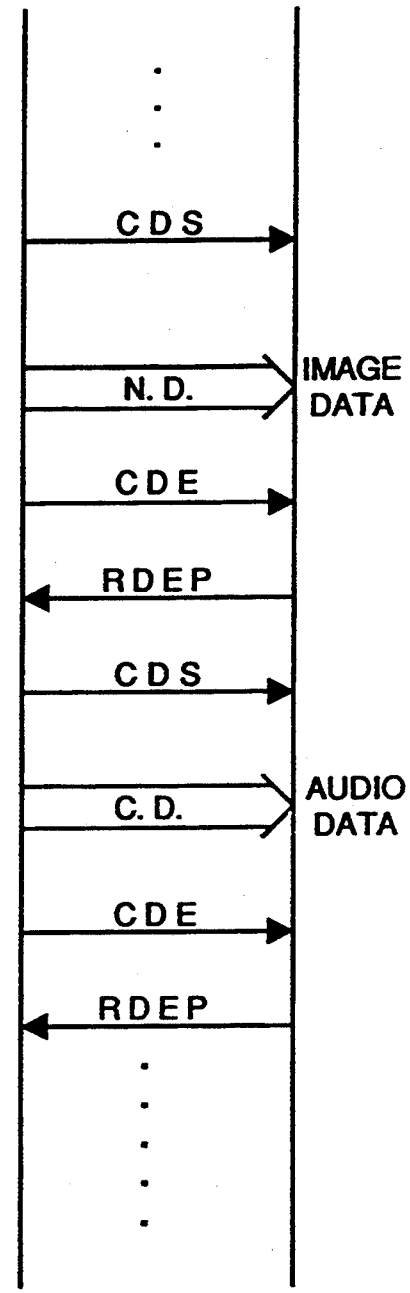
Figure 2C:
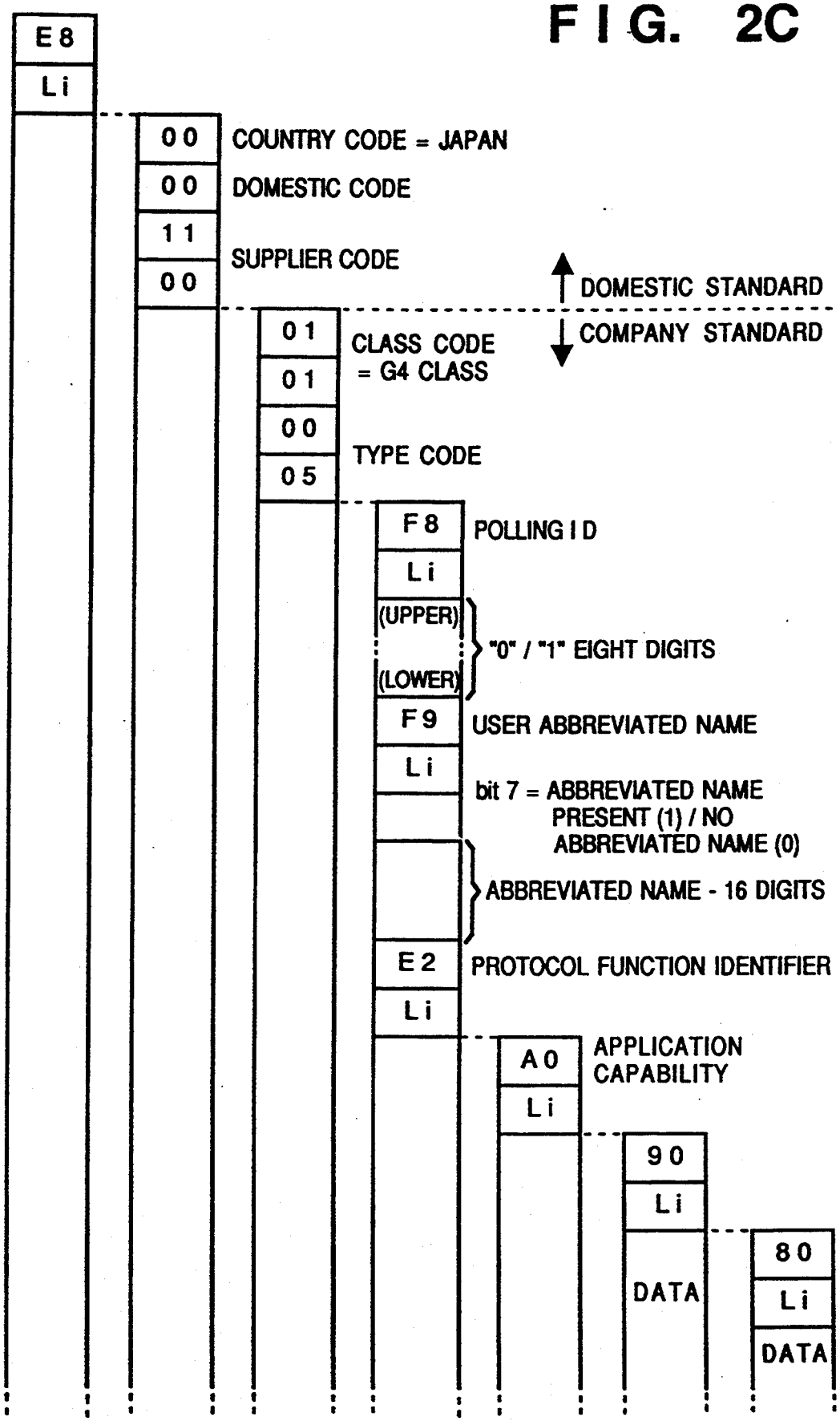
FIG. 2C is a diagram showing an example of a control document according to this embodiment.

FIGS. 2A and 2B are diagrams illustrating examples of communication procedures in recommendation T62 according to this embodiment, and FIG. 2C is a diagram showing an example of a control document according to this embodiment.

FIGS. 2A and 2B illustrate two types of methods for a case where coded audio data are transmitted and received in multidocuments. Communication Method 1 shown in FIG. 2A is a multidocument transceiving method in which audio data initially are transmitted/received in a control document, after which, in the next document, image data are transmitted/received in a normal document. Communication Method 2 shown in FIG. 2B is a multidocument transceiving method in which image data initially are transmitted/received in a normal document, after which, in the next document, audio data are transmitted/received in a control document.

In FIG. 2C, the control document is recommended in CCITT. T62. The data placed in this control document is divided according to domestic standards and company standards (a manufacturer's own mode). In this embodiment, a transmission is made in which an identifier (90), which indicates voice mail, and data are placed in application capability within the company standards. Text data also can be placed in the above-mentioned application capability as an identifier (80).

A method of communication according to this embodiment will now be described.

Figure 3:
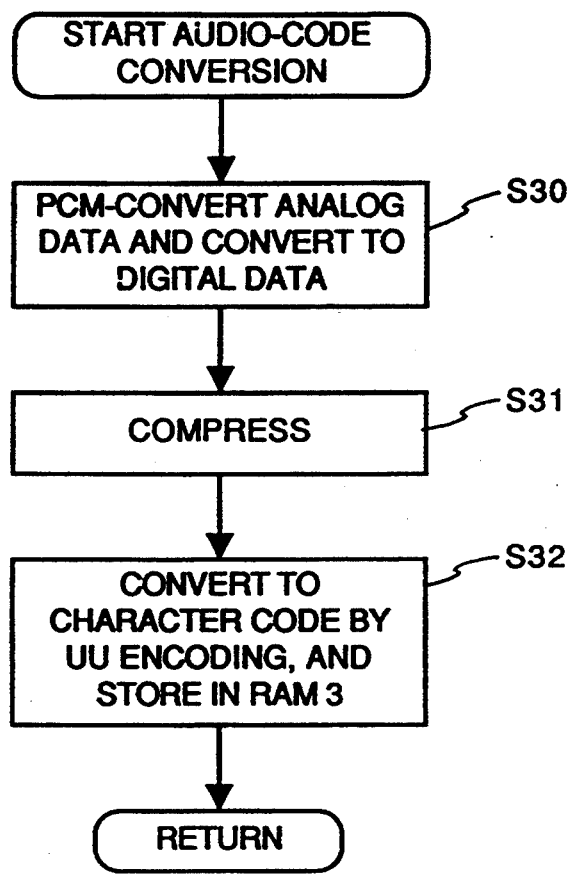
FIG. 3 is a flowchart for describing a voice-code converting procedure according to this embodiment.

FIG. 3 is a flowchart for describing a voice-code converting procedure according to this embodiment.

The procedure illustrated in FIG. 3 shows the details of a voice-code converting procedure in first through ninth communication control procedures described below. First, at step S30 in FIG. 3, processing is executed for sampling analog data at a predetermined sampling rate and converting the data into digital data. This is followed by step S31, at which processing is executed for compressing the data based upon the continuity of the digital data obtained at step S30. For one example of a compressing method, see "A Technique for High Performance Data Compression" by Terry A. Welch, IEEE Computer, vol. 17, No. 6 (June, 1984), pp. 8~19.

Since compressed data are data which possess no meaning as code data, these data cannot be transmitted. Accordingly, at step S32, the compressed data are converted into a character code by a UNIX UU encoding method, and the character code is stored in the RAM 3. It should be noted that even if a character code is converted into a character, audio is not put into the form of documentation.

Figure 4:
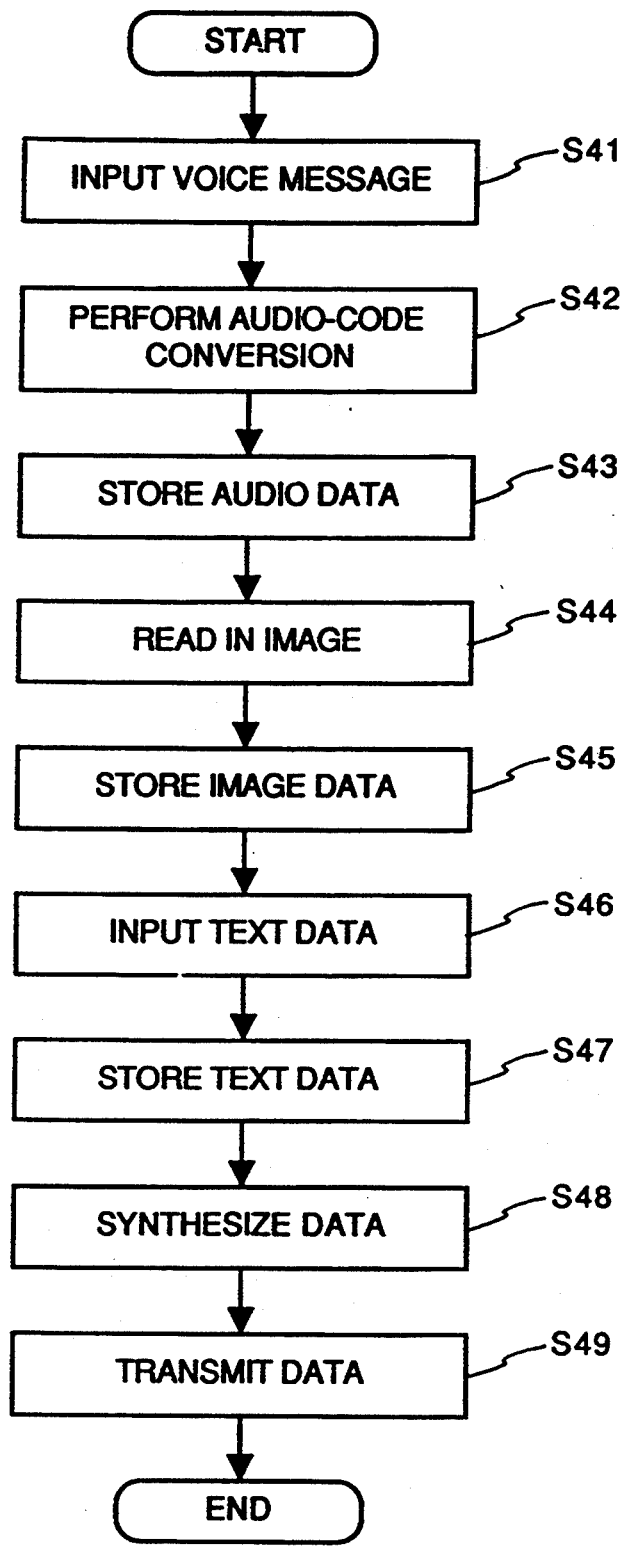
FIG. 4 is a flowchart for describing a first communication control procedure by a CPU according to this embodiment.

FIG. 4 is a flowchart for describing a first communication control procedure executed by the CPU 1 of this embodiment. The illustrated procedure is stored in the ROM 2 as a control program of the CPU 1. FIG. 4 is a processing procedure for a case where audio data, image data or text data are transmitted by a facsimile machine.

Step S41 calls for a voice message from the handset 4 to be stored in the RAM 3 as audio data. The above-mentioned voice-code conversion of FIG. 3 is performed at step S42. This is followed by step S43, at which the code data of RAM 3 are accumulated in the RAM 3 upon being consolidated in the form of a control document capable of being transmitted by facsimile.

At step S44, a document that has been set in place is read by the reader 7 and converted into image data thereby. Next, at step S45, the inputted image data are code-compressed into an MH code or MR, MMR codes capable of being transmitted by facsimile, and the compressed data are accumulated in the RAM 3. Step S46 calls for data inputted from the key input unit 11 to be stored in the RAM 3 as text data. This is followed by step S47, at which the text data in RAM 3 are accumulated in the RAM 3 upon being consolidated in the form of a control document capable of being transmitted by facsimile. At step S48, the control document for the voice message created at step S43, the normal document based upon compressed data created at step S45 and the control document for text data created at step S47 are combined in the form of a multidocument and accumulated in the RAM 3. This is followed by step S49, at which the multidocument created at step S48 is transmitted to line 13 via the communication controller 8.

Figure 5:
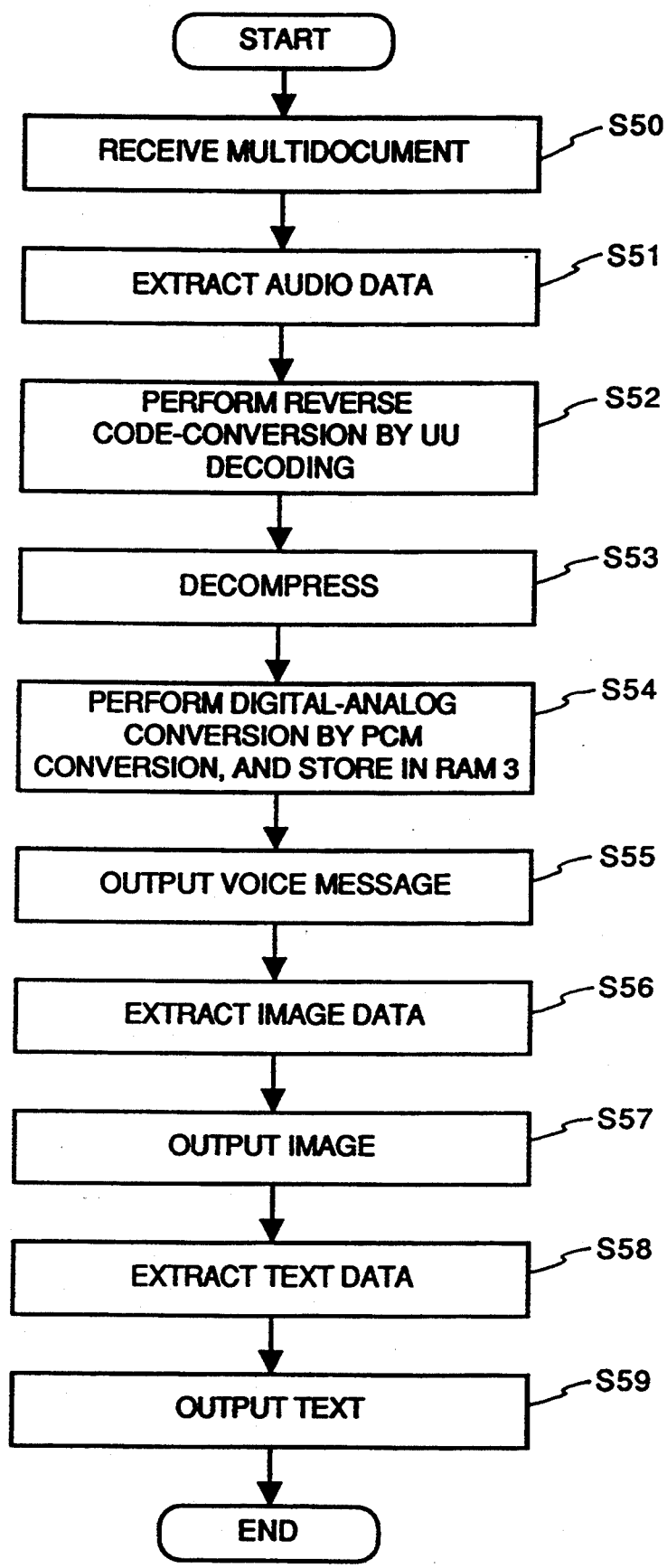
FIG. 5 is a flowchart for describing a second communication control procedure by a CPU according to this embodiment.

FIG. 5 is a flowchart for describing a second communication control procedure executed by the CPU 1 of this embodiment. The illustrated procedure is stored in the ROM 2 as a control program of the CPU 1. FIG. 5 is a processing procedure for a case where audio data, image data or text data are received by a facsimile machine.

Step S50 in FIG. 5 calls for the multidocument data received from line 13 to be stored in the RAM 3 using the communication controller 12. Next, at step S51, the attributes of the documents are verified from the multidocument data of RAM 3, the audio data are extracted and these data are again stored in the RAM 3. This is followed by step S52, at which the audio data (code data) stored in the RAM 3 are reverse-code converted by UU encode using the code converter 6. Then, at step S53, the reverse-code converted digital data are decompressed, and the decompressed digital data are converted into analog data by a PCM conversion and then stored again in the RAM 3 at step S54.

Step S55 calls for the audio data in RAM 3 to be outputted as audio using the handset 4. Next, at step S56, the attributes of the documents are verified from the multidocument data of RAM 3, the image data are extracted and these data are again stored in the RAM 3. The image data stored in the RAM 3 are printed out at step S57 using the print output unit 8. Next, at step S58, the attributes of the documents are verified from the multidocument data of RAM 3, the text data are extracted and these data are again stored in the RAM 3. The text data stored in the RAM 3 are printed out at step S59 using the print output unit 8.

Figure 6:
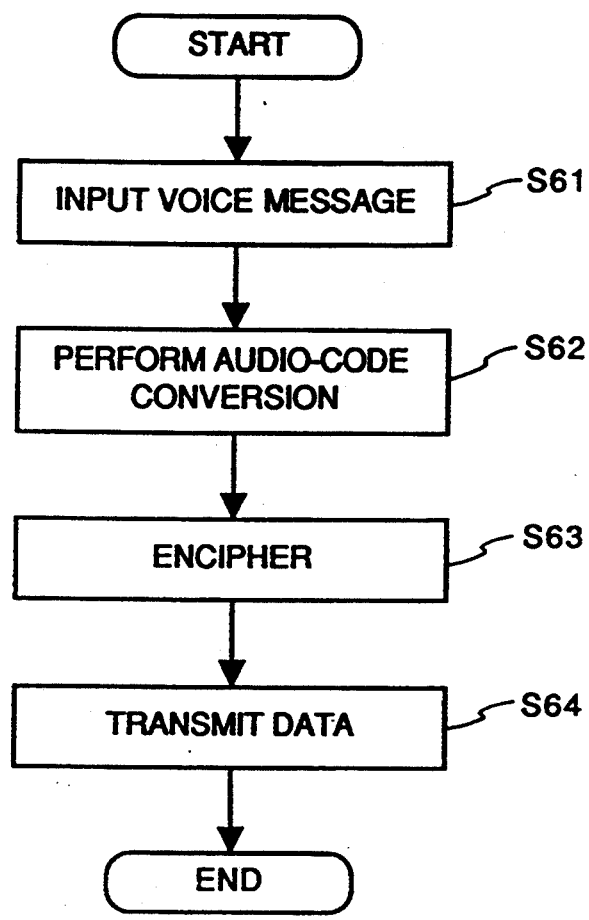
FIG. 6 is a flowchart for describing a third communication control procedure by a CPU according to this embodiment.

FIG. 6 is a flowchart for describing a third communication control procedure executed by the CPU 1 of this embodiment. The illustrated procedure is stored in the ROM 2 as a control program of the CPU 1. FIG. 6 is a processing procedure for a case where audio data is enciphered and transmitted by a facsimile machine.

Step S61 calls for a voice message from the handset 4 to be stored in the RAM 3 as audio data. At step S62, the audio data are subjected to the above-mentioned voice-code conversion of FIG. 3.

This is followed by step S63, at which the code data of RAM 3 are accumulated in the RAM 3 upon being enciphered using the enciphering converter 15. The enciphered audio data (code data) created at step S63 are transmitted to line 13 via the communication controller 8 at step S64.

The enciphering of code data is carried out through a method of scrambling predetermined data in the code data, as is well known in the enciphering of image data in the prior art.

FIG. 7 is a flowchart for describing a fourth communication control procedure executed by the CPU 1 of this embodiment. The illustrated procedure is stored in the ROM 2 as a control program of the CPU 1. In image and text data, the data classification and method of reception employ the same method as shown in FIG. 5. FIG. 7 is a processing procedure for a case where enciphered audio data are received by a facsimile machine.

Step S70 in FIG. 7 calls for the enciphered data received from line 13 to be stored in the RAM 3 using the communication controller 12. Next, at step S71, the enciphered data in RAM 3 are restored to the original audio data (code data) using the enciphering converter 15, and the restored data are again stored in the RAM 3.

Here the predetermined data that have been scrambled are eliminated from the received data, whereby a conversion which is the reverse of enciphering is executed.

This is followed by step S72, at which the audio data (code data) stored in the RAM 3 are reverse-code converted by UU encode using the code converter 6. Then, at step S73, the reverse-code converted digital data are decompressed, and the decompressed digital data are converted into analog data by a PCM conversion and then stored again in the RAM 3 at step S74.

The audio data in RAM 3 are outputted as audio using the handset 4 at step S75.

Figure 8:
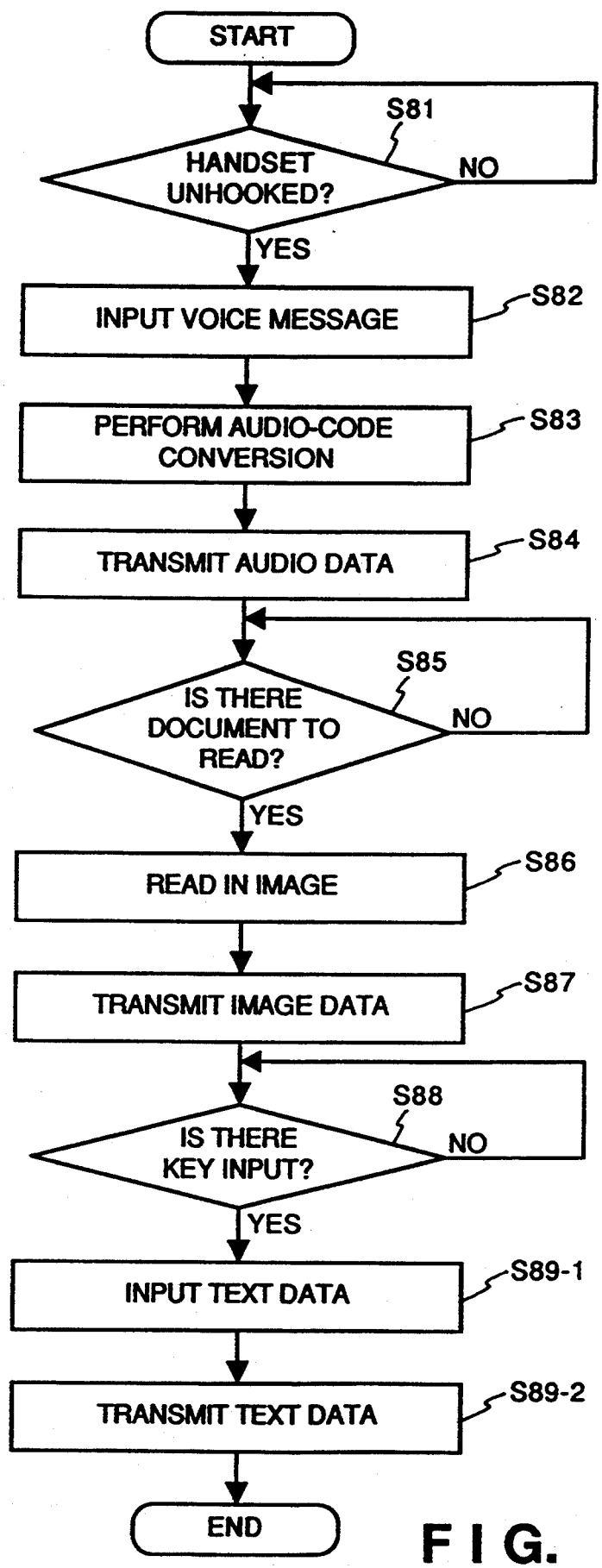
FIG. 8 is a flowchart for describing a fifth communication control procedure by a CPU according to this embodiment.

FIG. 8 is a flowchart for describing a fifth communication control procedure executed by the CPU 1 of this embodiment. The illustrated procedure is stored in the ROM 2 as a control program of the CPU 1. FIG. 8 is a method of rapidly putting audio data, image data and text data into the form of a multidocument and then transmitting the same by a facsimile machine.

At step S81 in FIG. 8, the system waits for the handset 4 to be raised (to attain the "UNHOOKED" state). The program proceeds to step S82 if the handset 4 has been unhooked. Step S82 calls for a voice message from the handset 4 to be stored in the RAM 3 as audio data. At step S83, the audio data are subjected to the above-mentioned voice-code conversion of FIG. 3.

Next, at step S84, the code data in RAM 3 are transmitted in the form of one control document to the line 13 via the communication controller 12. This is followed by step S85, at which it is determined whether a document has been set for the reader 7 to read. If a document has been set in place, the program proceeds to step S86, at which the set document is read by the reader 7 and converted into image data thereby. Next, at step S87, the inputted image data are code-compressed into an MH code or MR, MMR codes capable of being transmitted by facsimile, and the compressed data are transmitted, as a second normal document of a multidocument, to the line 13 via the communication controller 12. The system then waits for an input from the key input unit 11 at step S88, and the program proceeds to step S89-1 if an input is made. Step S89-1 calls for the data inputted from the key input unit 11 to be stored in the RAM 3 as text data. This is followed by step S89-2, at which the text data in RAM 3 are transmitted, as a third control document of a multidocument, to the line 13 via the communication controller 12.

FIG. 9 is a flowchart for describing a sixth communication control procedure executed by the CPU 1 of this embodiment. The illustrated procedure is stored in the ROM 2 as a control program of the CPU 1. FIG. 9 is a method of extracting audio data, image data and text data from stored data, putting the extracted data into the form of a multidocument and then transmitting the same by a facsimile machine.

At step S90 in FIG. 9, audio data stored in the data storage unit 16 are displayed on the display unit 9 in the order in which they were inputted, and an item of audio data is selected by a cursor. The selected voice message is outputted as audio from the handset 4 at step S91. Next, it is determined at step S92 whether the outputted voice message is the one sought. If it is ("YES" at step S92), the program proceeds to step S93. If the voice message is not the one sought, the program returns from step S92 to step S90. At step S93, the selected audio data are registered in the data storage unit 16 as one control document. Then, at step S95, the text data stored in the data storage unit 16 are displayed on the display unit 9 in the order in which they were inputted, and an item of text data is selected by a cursor and registered in the data storage unit 16.

This is followed by step S96, at which the control document for the voice message created at step S93, the normal document based upon compressed data created at step S94 and the control document for text data created at step S95 are combined in the form of a multidocument and registered in the storage unit 16. Next, at step S97, the multidocument created at step S96 is transmitted to line 13 via the communication controller 12.

FIG. 10 is a flowchart for describing a seventh communication control procedure executed by the CPU 1 of this embodiment. The illustrated procedure is stored in the ROM 2 as a control program of the CPU 1. FIG. 10 is a processing procedure for a case where audio data, image data and text data are received and rapidly outputted by a facsimile machine.

Step S100 calls for multidocument data received from the line 13 to be stored in the RAM 3 using the communication controller 12. Next, at step S101, the attributes of the documents are verified from the document data in the multidocument data of RAM 3, and the audio data are removed. This is followed by step S102, at which information reading "With voice message" is appended to header information. Next, at step S103, the attributes of the documents are verified from the multidocument data of RAM 3, and the image data are extracted. Then, at step S104, the header information created at step S102 is appended to the extracted image data, after which the image is printed out using the print output unit 8. Next, at step S105, the attributes of the documents are verified from the multidocument data of RAM 3, and the text data are extracted. Then, at step S106, the header information created at step S102 is appended to the extracted text data, after which the text is printed out using the print output unit 8.

Figure 11:
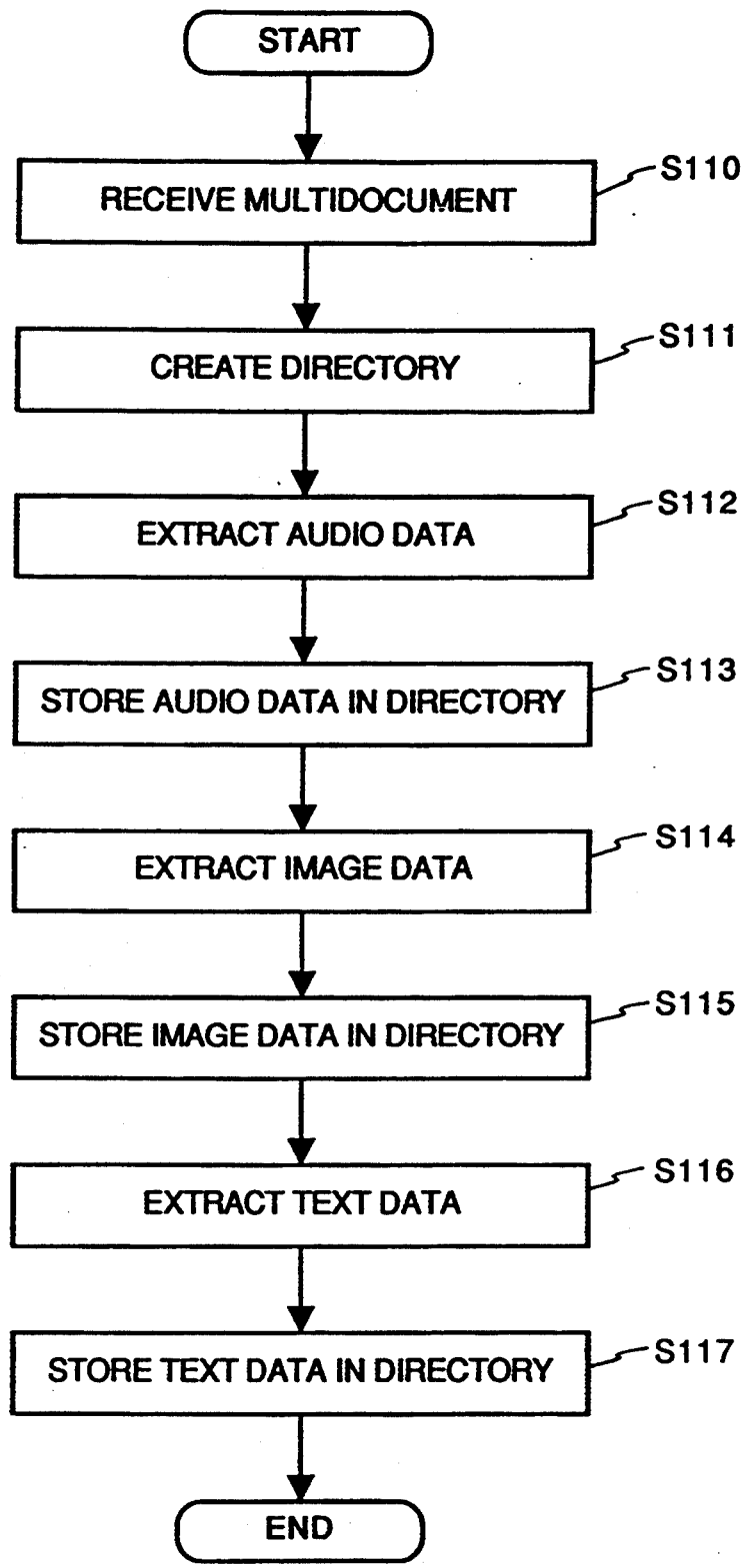
FIG. 11 is a flowchart for describing a eighth communication control procedure by a CPU according to this embodiment.

FIG. 11 is a flowchart for describing an eighth communication control procedure executed by the CPU 1 of this embodiment. The illustrated procedure is stored in the ROM 2 as a control program of the CPU 1. FIG. 11 is a processing procedure for a case where audio data, image data and text data are received and stored temporarily in the data storage unit by a facsimile machine.

Step S110 calls for multidocument data received from the line 13 to be stored in the data storage unit 16 using the communication controller 12. Next, at step S111, a directory for document storage is created in the data storage unit 16. At step S112, the attributes of the documents are verified from the multidocument data of storage unit 16, and the audio data are extracted. This is followed by step S113, at which the audio data extracted at step S112 are stored in the directory of step S111. Next, at step S114, the attributes of the documents are verified from the multidocument data of storage unit 16, and the image data are extracted.

The image data extracted at step S114 are stored in the directory of step S115. Next, at step S116, the attributes of the documents are verified from the multidocument data of storage unit 16, and the text data are extracted. Then, at step S117, the text data extracted at step S116 are stored in the directory of step S115.

Figure 13A:
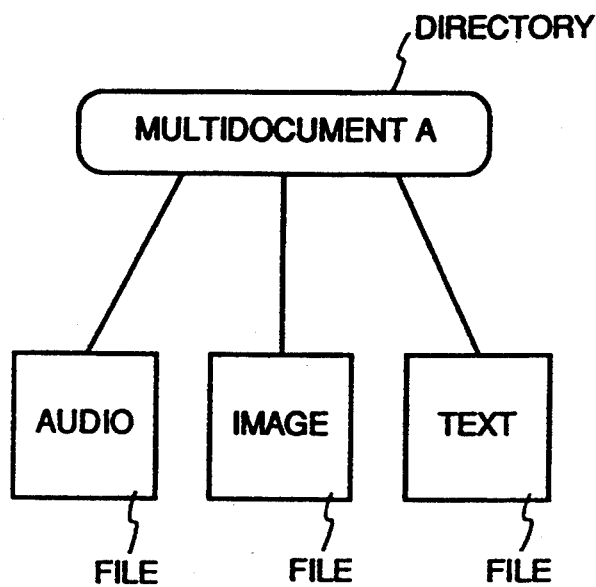

The structure of the directory and the procedure for referring to it are illustrated in FIGS. 13 through 15.

Figure 12:
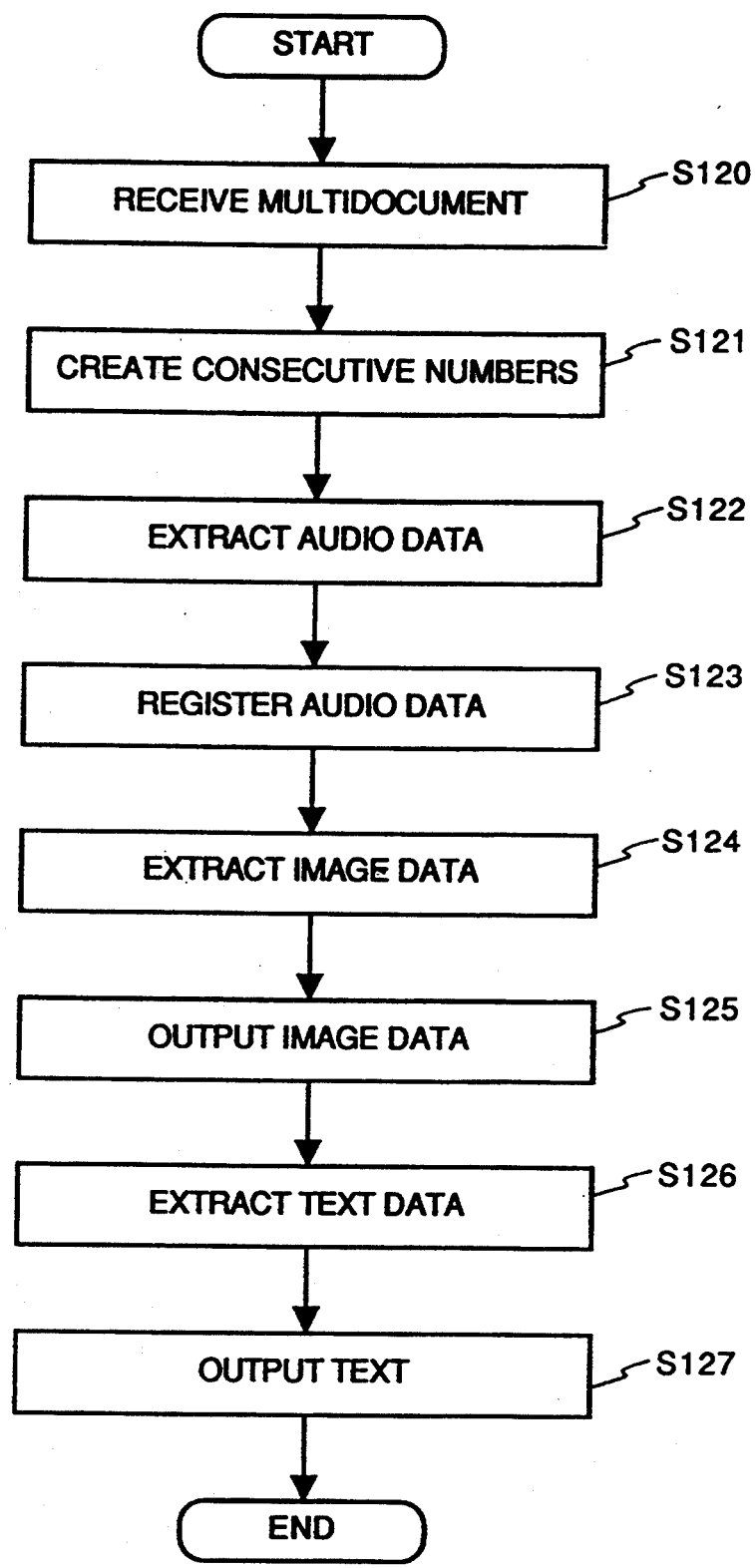
FIG. 12 is a flowchart for describing a ninth communication control procedure by a CPU according to this embodiment.

FIG. 12 is a flowchart for describing a ninth communication control procedure executed by the CPU 1 of this embodiment. The illustrated procedure is stored in the ROM 2 as a control program of the CPU 1. FIG. 12 is a processing procedure for a case where audio data, image data and text data are received and only the audio data are stored temporarily in the data storage unit by a facsimile machine.

Step S120 calls for multidocument data received from the line 13 to be stored in the data storage unit 16 using the communication controller 12. Next, at step S121, consecutive numbers are created in order to identify each of the documents. At step S122, the attributes of the documents are verified from the multidocument data of storage unit 16, and the audio data are extracted. This is followed by step S123, at which the audio data extracted at step S122 are stored in the data storage unit 16 with consecutive numbers attached to them. The consecutive numbers are subsequently retrieved and outputted.

Next, at step S124, the attributes of the documents are verified from the multidocument data of storage unit 16, and the image data are extracted. After the consecutive numbers created at step S121 are attached to the extracted image data, the image data are printed out at step S125 using the print output unit 8. Next, at step S126, the attributes of the documents are verified from the multidocument data of storage unit 16, and the text data are extracted. After the consecutive numbers created at step S121 are attached to the extracted text data, the text data are printed out at step S127 using the print output unit 8.

FIGS. 13 through 15 are diagrams for giving a supplementary explanation of the eighth communication control procedure according to this embodiment. These diagrams illustrate the structure of the directory and the method of referring to it.

The data storage unit 16 is partitioned into directory units (see FIG. 13), each of which has a label such as "Multidocument A". Under the label, a plurality of files in document units, namely as audio, image and text files, are present. In the case of a label "Multidocument B", a plurality of files in document units, namely audio, image and text files, are present under the label.

In terms of structure, the data of the label "Multidocument A" (FIG. 14) is composed of the time received (the time at which a facsimile transmission was received), the other party's dial number (the dial number of the party that made the transmission), the other party's abbreviated name (the abbreviated name of the party that made the transmission), the receiving party's abbreviated name (there are instances where the abbreviated name of the receiving party is included when the sending party specifies the receiving party), and a related-document pointer (a pointer which indicates a multidocument sent to another party or a multidocument sent previously from another party). These are used in order to refer to the directory.

The information displayed by the LCD of the display unit 9 when the directory is referred to is the content of the multidocument of each directory. Instances of reception are indicated at 1, 2, 3, . . . in descending order starting from the most recent. Reception time, the other party's abbreviated name, the other party's dial number and the content of the reception (sound: voice mail; picture: image data; document: text data) are displayed for each instance of reception, and selection is made by entering a number using a key or by employing the cursor for the selection.

Thus, in accordance with the present embodiment, as described above, means for converting audio (analog data) into digital data and means for converting the digital data into code data are provided. As a result, a voice message inputted from a telephone or the like is converted into code data and it is possible to transmit this data upon unifying it with facsimile image and/or text data.

The foregoing makes it possible to append a voice message in order to supplement the content of transmitted image data. Furthermore, applying this feature makes it possible to distinguish the content of image data by a voice message before the image data are outputted. This enables paper resources to be utilized effectively, as by enabling the user to exclude output of an unwanted image sent by wrongful use of facsimile transmission. In addition, when a questionnaire or the like is transmitted, responses having greater accuracy can be gathered by offering guidance through voice messages.

Further, by converting audio into code data, the code data may be stored in an external device and a voice message is capable of being edited by using the stored data.

As a result of the foregoing, effective utilization can be made of voice messages that the user has recorded in the past. In addition, a voice message sent from another party is stored and this voice message is appended to a voice message or image data to be transmitted for the purpose of replying, whereby the replying party can be notified more clearly as to the nature of the matter requiring a reply.

Further, it is possible to manage a history of responses and agreements by accumulating and consolidating audio and images sent in combined form. This makes it possible to verify the progress of agreements or transactions by storing telephone responses, which are transitory in nature, together with the associated image data and managing this information.

Further, the enciphering not only of images as in the prior art but also of audio from a telephone makes it possible to improve the reliability of communication in terms of maintaining the confidentiality of communication data. A combination of image and/or text data with coded audio raises the value of the individual items of information makes it possible to respond more accurately to the needs of a multimedia-information culture.

As a modification of the foregoing embodiment, identifiers for audio and for images/text can be set in the content of a document, thereby making possible transmission to the line 13 in the form of a single document instead of using the multidocument of step S110.

The present invention is not limited to the above-described embodiment but can be modified in various ways within the scope of the claims.

It should be noted that the present invention may be applied to a system composed of a plurality of devices or to an apparatus comprising one device. It goes without saying that the present invention can be applied also to a case where the above-mentioned effects are attained by supplying a program to a system or apparatus.

What is claimed is:

1. A communication processing apparatus comprising:
    first converting means for converting an analog audio signal into digital audio data;
    second converting means for converting the digital audio data, which has been converted by said first converting means, into character code data so as to be transmittable as a control document; and
    transmitting means for transmitting the character code data converted by said second converting means and document data including image data, wherein said transmitting means transmits a multidocument including a control document and a normal document, in which the converted character code data serve as the control document and the image data serve as the normal document, and
    wherein when said transmitting means transmits the audio signal as character code data, said transmitting means sets a type of data of the control document as audio data and transmits the character code data.

2. The apparatus according to claim 1, wherein the document data further contain text data and wherein the text data correspond to the audio signal and serve as part of the control document and said transmitting means transmits the text data.

3. The apparatus according to claim 2, further comprising:
    receiving means for receiving data including a multidocument from an apparatus having means performing functions corresponding to the first and second conversion functions and the transmitting function of said communication processing apparatus, the received multidocument including code data corresponding to an audio signal and document data including image data and text data corresponding to the audio signal;
    management means connected to said receiving means for managing, in accordance with a consecutively assigned number, all of the code data, the image data and the text data corresponding to the audio signal in the received multidocument;
    storage means connected to said managing means for storing the code data managed by said managing means; and
    output means connected to said managing means for appending said number to and outputting the text data and image data managed by said managing means.

4. The apparatus according to claim 1, wherein said second converting means includes compressing means for compressing the digital data to convert said digital data into the code data.

5. The apparatus according to claim 4, wherein said second converting means includes enciphering means for enciphering compressed code data.

6. The apparatus according to claim 1, further comprising:
    receiving means for receiving data including code data corresponding to an audio signal from an apparatus having means performing functions corresponding to the first and second conversion functions and the transmitting function of said communication processing apparatus;
    third converting means for converting, into digital data, the code data corresponding to the audio signal in the data received by said receiving means;
    fourth converting means for converting, into analog data, the digital data converted by said third converting means; and
    output means for producing an audio output based upon the analog data converted by said fourth converting means.

7. The apparatus according to claim 6, wherein said third converting means includes decompressing means for decompressing the code data to convert said code data into the digital data.

8. The apparatus according to claim 1, further comprising:
    receiving means for receiving data from an apparatus having means performing functions corresponding to the first and second conversion functions and the transmitting function of said communication processing apparatus, the data containing a normal document and a control document having code data corresponding to an audio signal;

storage means for storing, as a directory, the control document and the normal document contained in the data received by said receiving means;

third converting means for converting, into digital data, the code data corresponding to the audio signal contained in the control document stored by said storage means in response to an externally applied command;

fourth converting means for converting, into analog data, the digital data converted by said third converting means; and output means for producing an audio output based upon the analog data converted by said fourth converting means.

9. The apparatus according to claim 8, wherein said third converting means includes decompressing means for decompressing the code data to convert said code data into the digital data.

10. The apparatus according to claim 1, wherein said transmitting means transmits the converted code data as the control document, and transmits the image data as the normal document, in accordance with CCITT Recommendation T.62.

11. A communication processing system for performing communication processing between a transmitting apparatus and a receiving apparatus via a line;

said transmitting apparatus having:

first converting means for converting an analog audio signal into digital audio data;

second converting means for converting means for converting the digital audio data, which has been converted by said first converting means, into character code data so as to be transmittable as a control document; and transmitting means for transmitting the character code data converted by said second converting means and document data including image data; and said receiving apparatus having:

receiving means for receiving data from said transmitting apparatus;

third converting means for converting, into digital audio data, character code data corresponding to an audio signal in the data received by said receiving means;

fourth converting means for converting the digital data, which has been converted by said third converting means, into analog audio data; and output means for producing an audio output based upon the analog audio data converted by said fourth converting means, wherein said transmitting means transmits a multidocument including a control document and a normal document, in which the converted character code data converted by said second converting means serve as the control document and the image data serve as the normal document, wherein when said transmitting means transmits the audio signal as character code data, said transmitting means sets a type of data of the control document as audio data and transmits the character code data, and wherein when a control document received by said receiving means has the type of data set as audio data, said third converting means converts the character code data into the digital audio data.

12. The system according to claim 11, wherein said document data further contain text data, wherein the text data serve as part of the control document and said transmitting means transmits the text data.

13. The system according to claim 11, wherein said second converting means includes compressing means for compressing the digital data to convert said digital data into the code data, and said third converting means includes decompressing means for decompressing the code data to convert said code data into the digital data.

14. The system according to claim 11, wherein said transmitting means transmits the converted code data as the control document, and transmits the image data as the normal document, in accordance with CCITT Recommendation T.62.

15. A communication processing method comprising:

a first converting step of converting an analog audio signal into digital audio data;

a second converting step of converting the digital audio data, which has been converted at said first converting step, into character code data so as to be transmittable as a control document;

a transmitting step of transmitting the character code data converted at said second converting step and document data including image data;

a receiving step of receiving data transmitted at said transmitting step;

a third converting step of converting, into digital audio data, character code data corresponding to an analog audio signal in the data received at said receiving step;

a fourth converting step of converting the digital audio data, which has been converted at said third converting step, into analog audio data; and a step of producing an audio output based upon the analog audio data converted at said fourth converting step, wherein said transmitting step transmits a multidocument including a control document and a normal document, in which the converted code data serve as the control document and the image data serve as the normal document, wherein when said transmitting step transmits the audio signal as character code data, said transmitting step sets a type of data of the control document as audio data and transmits the character code data, and wherein when a control document received in said receiving step has the type of data set as audio data, said third converting step converts the character code data into the digital audio data.

16. The method according to claim 15, wherein said document data further contain text data, wherein the text data serve as part of the control document and said transmitting step transmits the text data.

17. The method according to claim 15, wherein said second converting step includes a step of compressing the digital data to convert said digital data into the code data, and said third converting step includes a step of decompressing the code data to convert said code data into the digital data.

18. The method according to claim 15, wherein said transmitting step transmits the converted code data as the control document, and transmits the image data as the normal document, in accordance with CCITT Recommendation T.62.

* * * * *

UNITED STATES PATENT AND TRADEMARK OFFICE
CERTIFICATE OF CORRECTION

PATENT NO. : 5,425,082
DATED : June 13, 1995
INVENTOR(S) : KAZUMASA SUGINO

It is certified that error appears in the above-indentified patent and that said Letters Patent is hereby corrected as shown below:

IN THE DRAWINGS

Figure 13B:
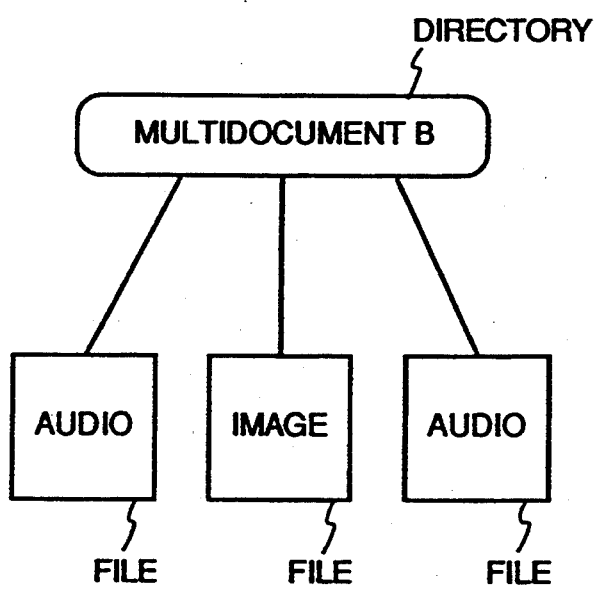

```
    Sheet 14 of 15, FIG. 13B: "AUDIO" (second occurrence)
                              should read --TEXT--.
```

COLUMN 13

```
    Line 34, "for converting means" should be deleted.
    Line 38, "and" should be deleted.
```

Signed and Sealed this

Seventeenth Day of October, 1995

Attest:

BRUCE LEHMAN

*Attesting Officer*  *Commissioner of Patents and Trademarks*